United States Patent
Hama

[11] 3,926,501
[45] Dec. 16, 1975

[54] DEVICE FOR DIRECTING LIGHT TO ILLUMINATING FIBER OPTICAL SYSTEM

[75] Inventor: Hiroyuki Hama, Fuchu, Japan

[73] Assignee: Olympus Optical Co., Ltd., Tokyo, Japan

[22] Filed: Oct. 18, 1971

[21] Appl. No.: 190,132

[30] Foreign Application Priority Data
Oct. 20, 1970 Japan.................................. 45-92291

[52] U.S. Cl. .............................. 350/96 B; 350/96 R
[51] Int. Cl.²............................................ G02B 5/16
[58] Field of Search............... 350/96 R, 96 B, 96 T

[56] References Cited
UNITED STATES PATENTS

| | | | |
|---|---|---|---|
| 2,419,836 | 4/1947 | Holbrook | 350/96 R X |
| 3,167,612 | 1/1965 | Strickholm | 350/96 B X |
| 3,357,423 | 12/1967 | Winchester et al. | 350/96 B X |
| 3,437,804 | 4/1969 | Schaefer et al. | 350/96 B X |
| 3,455,622 | 7/1969 | Cooper | 350/96 B X |
| 3,649,811 | 3/1972 | Schoenthaler | 350/96 R X |

FOREIGN PATENTS OR APPLICATIONS
1,469,368    1/1967    France .............................. 350/96 R

*Primary Examiner*—David H. Rubin
*Attorney, Agent, or Firm*—Hans Berman

[57] ABSTRACT

Device for directing light from a light source to an illuminating fiber optical system using a reflecting mirror in the form of an ellipsoid of revolution. The light source is located at one of the focal points of the ellipsoid of revolution while the other of the focal points is located in the light receiving end surface of the fiber optical system. The axis of the ellipsoid of revolution is offset at an acute angle from the axis of the light receiving end portion of the fiber optical system passing at right angles substantially through the center of the end surface so that the light emitted from the fiber optical system to the center zone of the area illuminated is weakened while the intensity of light in the marginal zone of the area is increased thereby obtaining uniform illumination of the area.

3 Claims, 8 Drawing Figures

DEVICE FOR DIRECTING LIGHT TO ILLUMINATING FIBER OPTICAL SYSTEM

BACKGROUND OF THE INVENTION

The present invention relates to a device for directing light from a light source to one end surface of an illuminating fiber optical system by using a relfecting mirror in the form of a surface of revolution.

An illuminating fiber optical system is very useful in illuminating an area adjacent to which it is difficult to provide a light source, and the fields of application of such an illuminating fiber optical system has been broadened.

In order to effectively supply a high quality, intensive light to a fiber optical system, a light source such as a xenon short-arc lamp has been usually utilized together with a reflecting mirror in the form of a surface of revolution such as a spheroid or an ellipsoid of revolution with the bright spot or point of the xenon short-arc lamp located in coincidence with one of the focal points of the ellipsoid of revolution nearer to the reflecting surface (referred to hereinafter as the first focal point) while the light incident end surface of the illuminating fiber optical system is positioned at the other of the focal points (referred to hereinafter as the second focal point) of the ellipsoid of revolution with the end surface being held substantially perpendicular to the axis of the ellipsoid of revolution, so that the image of the bright point of the xenon short-arc lamp is formed in the light incident end surface of the illuminating fiber optical system. By such a reflecting mirror in the form of an ellipsoid of revolution, the light bundle incident to the end surface of the fiber optical system is very effectively and efficiently converged thereto so that it is very advantageous in that the quantity of the illuminating light is efficiently introduced into the light incident end surface having a very limited area.

In such an illuminating optical system described above, however, the bright point of the light source has been located in an axis passing through substantially the center of the end surface of the illuminating fiber optical system perpendicular thereto, and, thus, the light bundle emitted from the fiber optical system converges in the central portion of the area illuminated by the light bundle thereby resulting in very low light quantity illuminating the annular marginal zone of the area illuminated. If the light quantity incident to the marginal annular zone of the area is made insufficient, the quality of the picture obtained by photography, particularly by color photography or appearing on color television is low.

SUMMARY OF THE INVENTION

An object of the present invention is to provide a novel and useful device for efficiently directing light from a light source to an illuminating fiber optical system which avoids the above described disadvantages of the prior art.

Another object is to provide a novel and useful device of the type described above for efficiently directing light from a light source in which the light quantity incident to the annular marginal zone of an area to be illuminated by the illuminating fiber optical system, which is supplied with the light by the device from the light source, is averaged or equalized with the light quantity incident to the central zone of the area.

The above object is achieved in accordance with the present invention by providing a device for directing light from a light source such as a xenon short-arc lamp to a light incident end surface of an illuminating fiber optical system by utilizing a reflecting mirror in the form of an ellipsoid of revolution with the bright spot or point of the light source being located in coincidence with the first focal point of the ellipsoid of revolution and with the second focal point thereof being located substantially at the center of the light incident end surface of the illuminating fiber optical system, the device being characterized in that the light source together with the first focal point of the ellipsoid of revolution is offset from an axis passing through substantially the center of the light incident end surface of the illuminating fiber optical system perpendicular thereto so that the intensity of light emanating from the light emitting end surface of the fiber optical system and incident to the marginal zone of the area illuminated by the illuminating fiber optical system is made high while the intensity of light incident to the central zone of the area is made low thereby permitting the averaging of the light intensity in the marginal zone and the central zone.

In accordance with another feature of the present invention, a plurality of light sources may be provided together with their reflecting mirrors aside the axis passing through substantially the center of the light incident end surface of the fiber optical system around the same so that the intensity of light incident to the area to be illuminated is averaged also in the circumferential direction in the respective annular zones of the area.

BRIEF DESCRIPTION OF THE DRAWINGS

FIGS. 2 – 4 are diagrams showing respectively the characteristics of a mirror having a reflecting face in the form of an ellipsoid of revolution, FIG. 2 showing the relationship between the magnification of image $m$ and the ratio $k$ of the major diameter with respect to the minor diameter of the ellipsoid forming the reflecting mirror, FIG. 3 showing the relationship between the incident angle $\theta_2$ of the light incident to the light incident end surface of the illuminating fiber optical system and the above mentioned ratio $k$, while FIG. 4 shows the relationship between the angle $\theta_1$ formed by the axis of the ellipsoid in the direction opposite to the second focal point and the light path emanating from the light source and the above mentioned ratio $k$;

DETAILED DESCRIPTION OF THE PREFERRED EMBODIMENTS

Figure 1:
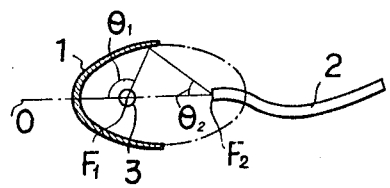
FIG. 1 is a schematic side view showing the prior art device for directing light from a light source to the light incident end surface of an illuminating fiber optical system.

Referring to FIG. 1, the first focal point $F_1$ of the ellipsoid of revolution forming the reflecting mirror 1 is located in the axis O passing through the center of the light incident end surface of the illuminating fiber optical system 2 perpendicular thereto while the second focal point $F_2$ is located substantially at the center of the light incident end surface.

A light source 3 such as a xenon short-arc lamp is located with its bright spot or point in coincidence with the first focal point $F_1$.

Assuming that the eccentricity of the ellipsoid of revolution is $e$ and the major diameter thereof is $2a$, the diameter of the light source 3 being $\phi_1$, the diameter of the light incident end surface of the illuminating fiber optical system 2 being $\phi_2$, the light emanating angle formed between the light path emanating from the light source 3 and the axis 0 starting from the first focal point $F_1$ in the direction remote from the second focal point $F_2$ being $\theta_1$, while the light incident angle formed between the light path incident to the light incident end surface and the axis 0 is $\theta_2$, then the magnification of the image of the light source 3 formed on the light incident end surface of the illuminating fiber optical system 2 is given by the following equation:

$$m = \frac{2}{1-e^2}(1 + e \cos \theta_1) - 1 \quad (1)$$

And the light incident angle $\theta_2$ is determined by the following equation:

$$\theta_2 = \sin^{-1} \frac{\sin \theta_1}{m} \quad (2)$$

On the other hand, it is practically difficult to make the maximum radius of the ellipsoid of revolution forming the reflecting mirror 1 smaller than the depth of the reflecting mirror 1 because of the limitation in the production techniques. Therefore, when the eccentricity $e$ is once determined, the range of the incident angle $\theta_1$ is limited by the following condition:

$$\frac{1 - \cos \theta_1}{(1 + e) \sin \theta_1} < 1 \quad (3)$$

Assuming that the ratio of the major diameter with respect to the minor diameter of the ellipsoid of revolution is $k$, then the following relationship exists between the ratio $k$ and the eccentricity $e$:

$$e^2 + k^2 = 1 \quad (4)$$

Figure 2:
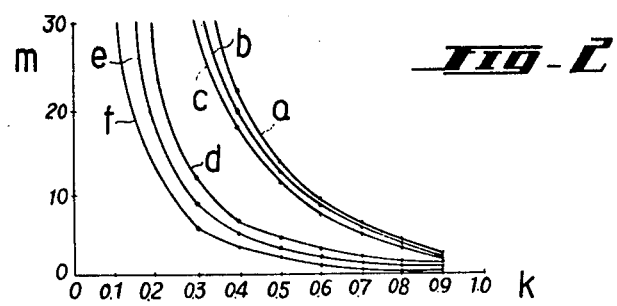
Figure 3:
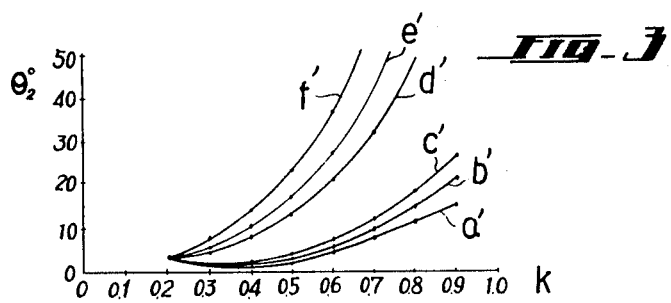
Figure 4:
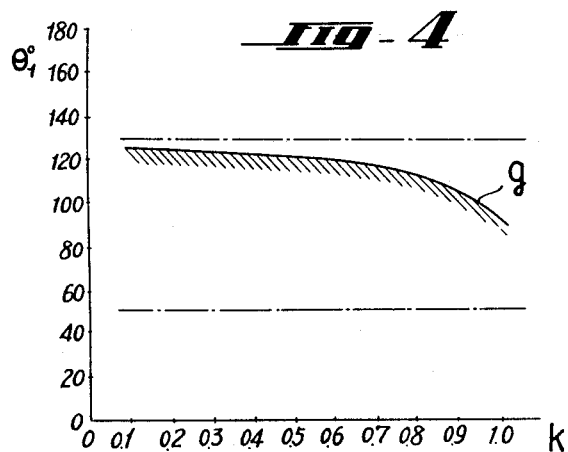

FIGS. 2 – 4 show the above relationships in various diagrams.

In FIG. 2, the ratio $k$ is taken in the abscissa while the magnification $m$ is represented by the ordinate, the angle $\theta_1$ being taken as the parameter for showing the relationship shown in equation (1), the curves $a, b, c, d$, $e$ and $f$ being obtained by the parameter $\theta_1$ set to 40°, 50°, 60°, 120°, 130° and 140°, respectively.

In FIG. 3, the ratio $k$ is represented in the abscissa, while the ordinate shows the incident angle $\theta_2$, the angle $\theta_1$ being taken as the parameter for showing the relationship represented by the equation (2), the curves $a', b', c', d', e'$ and $f'$ being obtained by varying the parameter $\theta_1$ to 40°, 50°, 60°, 120°, 130° and 140°, respectively.

In FIG. 4 the ratio $k$ is represented by the abscissa while the ordinate represents the angle $\theta_1$ so as to show the relationship shown by the inequality (3). The hatched area beneath the curve $g$ shows the domain in which the ellipsoid of revolution forming the reflecting mirror 1 can be practically manufactured.

In case a xenon short-arc lamp is used as the light source 3, the radiation angle characteristics of the light emitted from the lamp lies in the following range:

$$\theta_1 = 50° \text{ to } 130°$$

Therefore, it is seen from FIG. 4 that better reflection efficiency of the reflecting mirror is obtained as the ratio $k$ is made smaller. On the other hand, however, as the ratio $k$ is made smaller, the angle $\theta_2$ is made very small as is clear from FIG. 3, so that almost all the light rays emitted from the light emitting end surface of the fiber optical system 2 are focused in the central portion of the area to be illuminated because of the physical characteristics of the fiber optical system thereby resulting in the bright central portion of the area while the marginal annular zone is kept dark. Thus, it is difficult to obtain bright marginal annular zone of the area to be illuminated, unless the angle $\theta_2$ is made appropriately large at the sacrifice of the reflecting efficiency of the reflecting mirror to some extent.

On the other hand, if the ratio $k$ is made larger, the magnification $m$ is made smaller as is clear from FIG. 2. Therefore, the ratio $\phi_2/\phi_1$ must be kept small in order for the illuminating fiber optical system to efficiently receive the illuminating light from the light source. Therefore, if the value of $\phi_2$ is set to a constant value, then it is necessary to make the value $\phi_1$ large so as to satisfy the above mentioned condition, thereby requiring a large capacity of the light source.

Figure 5:
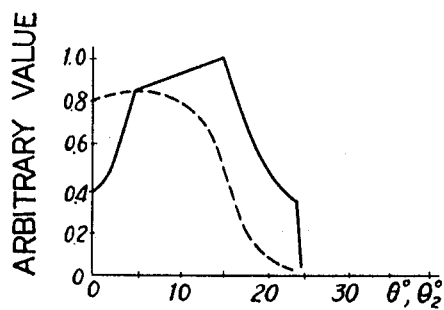
FIG. 5 is a diagram showing the characteristics of the ellipsoid of revolution, the ordinate of the solid line showing the intensity of light from the light source reflected by the ellipsoid of revolution and incident to the light incident end surface of the illuminating fiber optical system while the abscissa shows the above mentioned incident angle $\theta_2$, the broken line showing the characteristic curve of the intensity of light emanating from the light emitting end surface of the illuminating fiber optical system with the weight being given in consideration of the light transmitting efficiency of the illuminating fiber optical system shown in FIG. 6.

Assuming now that a light source of a large capacity having the value $\phi_1 = 0.8$ mm is used and the value $\phi_2$ is set to 3mm while the ratio $k$ is 0.65, then the light incident angle characteristics $I(\theta_2)$, i.e., the light intensity received as the function of the angle $\theta_2$, is represented by the following equations:

$$I(\theta_2) = \frac{\phi_1^2 \pi}{l_1^2} \cos \theta_2 \quad \text{(when } \phi_2/\phi_1 > m\text{)} \quad (5)$$

$$I(\theta_2) = \frac{\phi_2^2 \pi}{l_2^2} \cos \theta_2 \quad \text{(when } \phi_2/\phi_1 < m\text{)} \quad (5')$$

where:

$l_1 =$ the distance between the two focal points of the ellipsoid of revolution when $\phi_2/\phi_1 > m$, $l_2 =$ the distance between the two focal points of the ellipsoid of revolution when $\phi_2/\phi_1 < m$ The above relationships are shown by the solid line in FIG. 5. The maximum value of the curve of the solid line is obtained when $m = \phi_2/\phi_1$, this being practically the limit.

The curve indicated by the broken line in FIG. 5 shows the light emitting angle characteristics $I(\theta)$ of the illuminating fiber optical system 2, i.e., the light intensity emitted from the light emitting end surface of the fiber optical system as the function of the emitting angle $\theta$. The weight is given to this curve of the broken line in consideration of the light transmitting efficiency of the illuminating fiber optical system 2 shown in FIG. 6.

Figure 6:
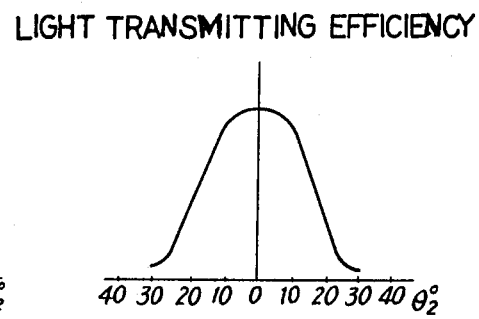
FIG. 6 is a diagram showing the light transmitting efficiency of the fiber optical system with respect to the light incident angle $\theta_2$.

The light transmitting efficiency of the fiber optical system 2 shown in FIG. 6 is obtained by assuming that the light intensity incident to the light incident end surface of the fiber optical system is equal regardless of the variation in the light incident angle $\theta_2$. The characteristics shown in FIG. 6 are the highest obtained in the prior art, no better results can be obtained because of the various limitations in the practical manufacture of the fiber optical system already described.

Figure 7:
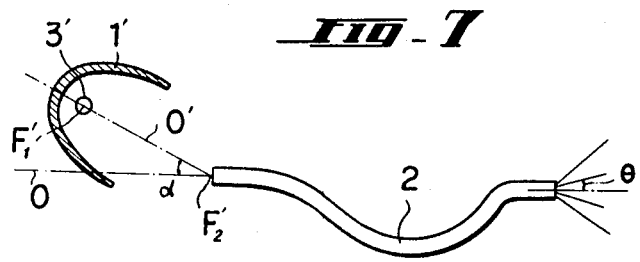
FIG. 7 is a schematic side view showing the arrangement of the embodiment of the present invention.

In accordance with the characteristic feature of the present invention, the light intensity incident to the marginal annular zone of the area to be illuminated is made high while the intensity of light incident to the central zone is made low for averaging the brightness of the area illuminated by means of the device of the present invention as shown in FIG. 7.

In the device of the present invention shown in FIG. 7, the reflecting mirror 1' in the form of an ellipsoid of revolution is so located that the first focal point $F_1'$ thereof is spaced from a line 0 passing through substantially the center of the light incident end surface of the illuminating fiber optical system 2 perpendicular thereto while the second focal point $F_2'$ is positioned substantially at the center of the light incident end surface, an angle $\alpha$ being formed between the axis 0' of the ellipsoid of revolution and the line 0.

The light source 3' is a xenon short-arc lamp whose bright point or spot of greatest brightness coincides with the first focal point $F_1'$.

Figure 8:
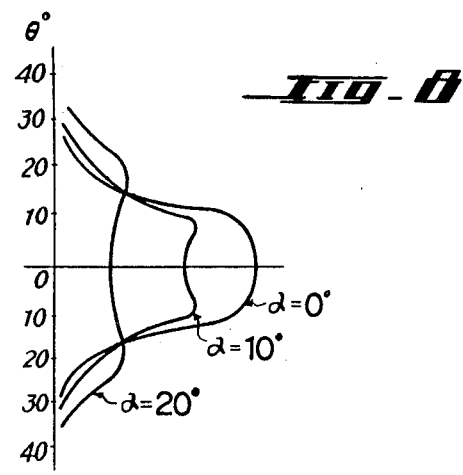
FIG. 8 is a diagram showing the characteristics of the effective illumination obtained by the present invention.

By the arrangement of the device shown in FIG. 7, the light emitting angle characteristics $I'(\theta)$ are made as shown in FIG. 8.

As is clear from FIG. 8, the peak of the light intensity at $\theta = 0°$ is rapidly reduced as the angle $\alpha$ is varied from 0° to about 20° while the intensity of light at about $\theta = 10°$ to 30° is rapidly increased so as to average the light intensity over substantially the entire area to be illuminated.

Thus, when the angle $\alpha$ is set to 20°, the intensity of light at $\theta = 0°$ is made about one third of that obtained when $\alpha = 0°$, while the range of the angle $\theta$, in which the intensity of light is about 50% of the maximum intensity, is increased by about 25°. The total light quantity transmitted through the illuminating fiber optical system 2 when the angle $\alpha$ is set to 20° is about two thirds of that obtained when the angle $\alpha$ is set to 0°. However, the reduction in the light quantity at $\theta = 0$ is compensated for by the increase in the light quantity in the marginal zone by using the reflecting mirror 1' and the light source 3' located at an angle of 20° with respect to the line 0 which is the axis of the fiber optical system 2, and it is ascertained that the light transmitting efficiency in the sense of the uniform illumination is made twice that obtained by the prior art device.

In accordance with a further feature of the present invention a plurality of light sources having small capacities may be arranged around the line 0 for obtaining more uniform illumination.

Thus, in accordance with the present invention, three lamps each having a capacity of only 75 watts arranged around the line 0 with the angle $\alpha$ set to 20° can be used to obtain sufficient and uniform illumination in place of a single lamp having a capacity of 500 watts which is located on the line 0, i.e., when the angle $\alpha$ is set to 0°.

In case a plurality of light sources are used, the number thereof may be arbitrarily selected and the angle $\alpha$ may not be constant for each of the light sources but may be selected appropriately for the respective light source. Thus, in accordance with the present invention, not only the uniform illumination is obtained, but also the area to be uniformly illuminated can be varied by appropriately arranging the light source(s).

I claim:
1. An illuminiating device comprising:
  a. a fiber optical system having a light receiving first end face, a light emitting second end face, and an axis perpendicular to said first end face substantially in the center of said first end face;
  b. a light source having a spot of greatest brightness; and
  c. mirror means for focusing the light of said source on said first end face,
    1. said mirror means having a reflecting face in the form of an ellipsoid of revolution about an axis of revolution and having two focal points spaced along said axis of revolution,
    2. said focal points substantially coinciding with said spot of greatest brightness and with said first end face respectively, whereby light of said source is emitted from said second end face for illuminating an adjacent area,
    3. said axis of revolution being inclined relative to said axis of said fiber optical system at an angle of inclination of approximately 20°, whereby the distribution of light over said area is more uniform than at an angle of inclination smaller than 20° and the light transmitting efficiency of said system is greater than at an angle of inclination greater than 20°.

2. An illuminating device as set forth in claim 1, wherein one of said focal points is located substantially in the center of said first end face.

3. A device as set forth in claim 1, said light source being a xenon short-arc lamp.

* * * * *